(12) United States Patent
Kerr

(10) Patent No.: US 6,428,873 B1
(45) Date of Patent: Aug. 6, 2002

(54) FLOOR MAT AND CONTINUOUS PROCESS FOR THE MANUFACTURE THEREOF

(75) Inventor: Robert C. Kerr, LaGrange, GA (US)

(73) Assignee: Milliken & Company, Spartanburg, SC (US)

( * ) Notice: Subject to any disclaimer, the term of this patent is extended or adjusted under 35 U.S.C. 154(b) by 1454 days.

(21) Appl. No.: 08/732,866

(22) Filed: Oct. 15, 1996

Related U.S. Application Data

(63) Continuation of application No. 08/320,737, filed on Oct. 11, 1994.

(51) Int. Cl.$^7$ ............................................. D04H 11/00
(52) U.S. Cl. ........................... 428/95; 428/97; 428/337
(58) Field of Search ............................. 428/95, 97, 337

(56) References Cited

U.S. PATENT DOCUMENTS

| | | | |
|---|---|---|---|
| 3,306,808 A | 2/1967 | Thompson et al. ............ 161/66 |
| 4,016,318 A | 4/1977 | DiGioia et al. ................ 429/95 |
| 4,130,535 A | 12/1978 | Coran et al. .......... 260/33.6 AQ |
| 4,234,646 A | 11/1980 | Thorsrud et al. .............. 428/95 |
| 4,298,637 A | * 11/1981 | Daniel et al. ............. 427/372.2 |
| 4,311,628 A | 1/1982 | Abdou-Sabet et al. .................... 260/33.6 AQ |
| 4,373,033 A | * 2/1983 | Gupta ....................... 428/95 X |
| 4,412,877 A | * 11/1983 | Vosburgh ................... 428/95 X |
| 4,421,809 A | * 12/1983 | Bish et al. ................. 428/95 X |
| 4,443,575 A | * 4/1984 | Iwai et al. ................... 524/486 |
| 4,477,299 A | 10/1984 | Friedrich ..................... 156/72 |
| 4,508,771 A | 4/1985 | Peoples, Jr. et al. ........... 428/95 |
| 4,594,390 A | 6/1986 | Abdou-Sabet et al. ....... 525/232 |
| 4,689,256 A | * 8/1987 | Slosberg et al. ............... 428/95 |
| 4,737,221 A | 4/1988 | Bell et al. .................... 156/231 |
| 4,741,065 A | 5/1988 | Parkins ........................ 15/217 |
| 4,746,688 A | * 5/1988 | Bistak et al. |
| 4,824,709 A | * 4/1989 | Tschirch ....................... 428/95 |
| 4,886,692 A | 12/1989 | Kerr et al. .................... 428/82 |
| 4,917,932 A | 4/1990 | McClung ...................... 428/90 |
| 5,198,277 A | * 3/1993 | Hamilton et al. .......... 428/95 X |
| 5,204,155 A | * 4/1993 | Bell et al. ..................... 428/95 |
| 5,227,214 A | 7/1993 | Kerr et al. .................... 428/95 |
| 5,233,787 A | 8/1993 | Andersen ................... 43/132.1 |
| 5,240,530 A | 8/1993 | Fink ............................ 156/94 |
| 5,305,565 A | 4/1994 | Nagahama et al. ............ 52/177 |

* cited by examiner

Primary Examiner—Elizabeth M. Cole
(74) Attorney, Agent, or Firm—Terry Moyer; William S. Parks

(57) ABSTRACT

The disclosure relates to a floor mat and method for producing the same. The floor mat includes a plurality of tufts extending from a carrier fabric which is joined by a layer of adhesive to a backing having at least one layer of vulcanized thermoplastic elastomer. The process for production of the floor mat includes applying an olefin based adhesive to the back of a primary tufted fabric which has been preheated. The process for production includes the further separate step of applying a sheet of vulcanized thermoplastic elastomer of between about 20 and 40 mils thickness with or without a layer of reinforcing material to the preheated adhesive backed primary tufted fabric. A second layer of vulcanized thermoplastic elastomer may thereafter be applied following another heating step.

3 Claims, 1 Drawing Sheet

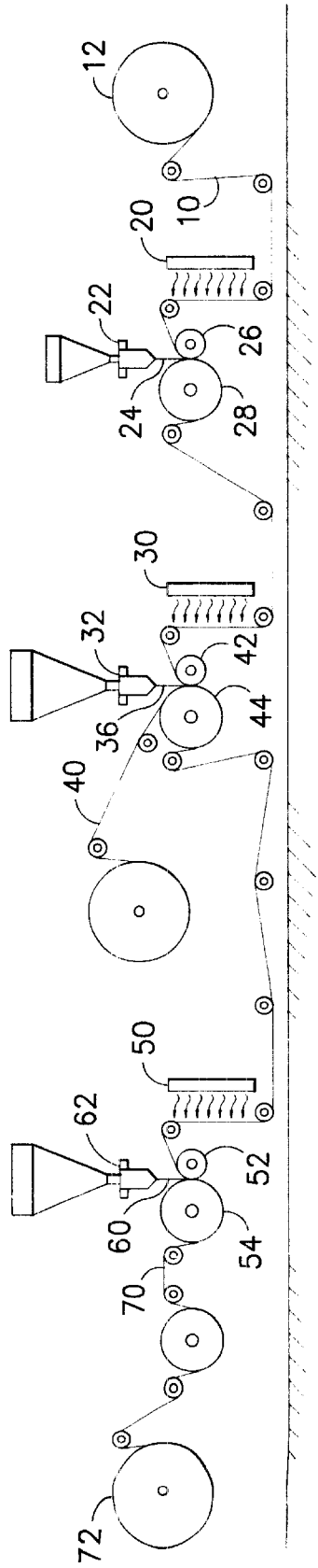
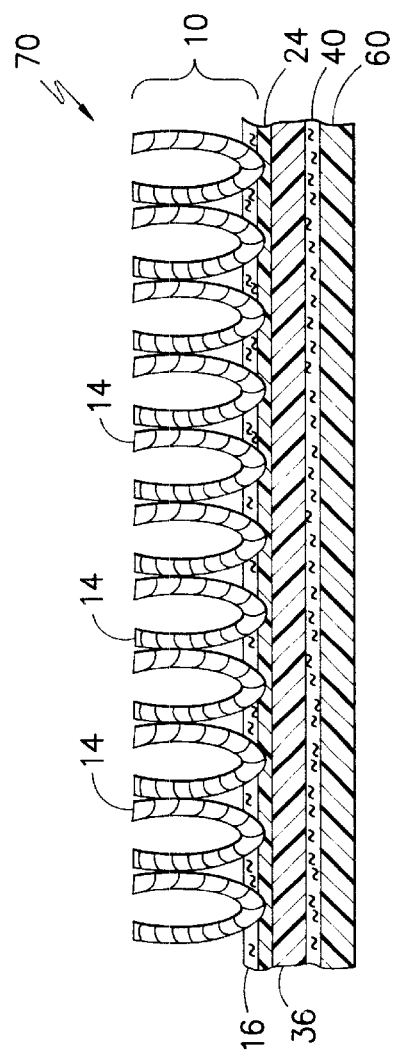
FIG. -1-
FIG. -2-

FLOOR MAT AND CONTINUOUS PROCESS FOR THE MANUFACTURE THEREOF

RELATED APPLICATIONS

This application is a continuation of pending prior application Ser. No. 08/320,737, filed on Oct. 11, 1994, of Robert C. Kerr for FLOOR MAT AND CONTINUOS PROCESS FOR THE MANUFACTURE THERE OF.

FIELD OF THE INVENTION

The present invention relates generally to launderable rubber backed floor mats of the type which have a pile surface on one side and a rubber or rubber-like material on the other side and a continuous process for producing the same. More particularly, the invention relates to the continuous production of floor mats involving the extrusion of a vulcanized thermoplastic elastomer as a backing material for a tufted fabric composite.

BACKGROUND

Dust control mats and other floor coverings having a pile side and a rubber backing are generally used in access ways where people tend to brush or scrape their feet in order to prevent carrying moisture and/or dirt into other areas of the premises. Normally these mats are located in areas of high pedestrian traffic such as doorways.

The art includes a number of configurations and features for various floor mats. Some patents which are believed to be illustrative of known floor coverings include U.S. Pat. No. 3,306,808 to Thompson, et al. issued Feb. 28, 1967; U.S. Pat. No. 4,741,065 to Parkins issued May 3, 1988; U.S. Pat. No. 4,886,692 to Kerr et al. issued Dec. 12, 1989; U.S. Pat. No. 5,227,214 to Kerr et al. issued Jul. 13, 1993; U.S. Pat. No. 5,240,530 to Fink issued Aug. 31, 1993; and U.S. Pat. No. 5,305,565 to Nagahama et al. issued Apr. 26, 1994; the teaching of all of which are incorporated herein by reference.

As will be appreciated by those of skill in the art, floor mats have conventionally consisted of a plurality of tufts in a primary backing adhered to a vulcanized thermoset rubber backing. Such a backing gives dimensional stability to the fabric surface while maintaining the mat's integrity during industrial wash processing. Heretofore, the production of launderable floor mats has relied on the use of thermoset rubber backings based on nitrile polymer formulas. While such mats perform very adequately, the manufacturer of such mats has historically been presented with certain limitations due to the formation of the mats as modular units as opposed to the continuous production made possible by the present invention.

Mats formed using thermoset rubber backings require the stationary compression and application of sufficient heat and pressure to vulcanize the rubber backing and adhere it to the fabric. Such batch operations are limited by the curing rate characteristics of the thermoset rubber. Additionally, the process has historically involved cutting the thermoset rubber to length, positioning the rubber backing on a carrier belt or conveyor and thereafter laying the tufted fabric onto the rubber backing and fusing the components together. Once vulcanized, any excess rubber not necessary for the finished specified dimensions of a thermoset mat is cut away and discarded rather than being easily recycled as in the present invention. The use of a process which can deposit an appropriate backing material onto a fabric substrate in a continuous manner thereby producing a mat material which can be cut to given dimensions therefore represents a useful advancement over the art.

OBJECTS AND SUMMARY OF THE INVENTION

In light of the foregoing, it is a general object of the present invention to provide a mat formed by the continuous disposition of a vulcanized thermoplastic elastomer onto a tufted fabric substrate.

It is a related object of the present invention to provide a process for depositing vulcanized thermoplastic elastomer onto a fabric substrate to achieve a desirable mat configuration.

Accordingly, it is a feature of the present invention to provide a continuous mat forming process wherein layers of adhesive and backing materials are deposited in a continuous fashion as layers across a tufted fabric composite.

In one aspect of the present invention a novel dust control mat is provided comprising a plurality of tufts in a primary base. A layer of thermoplastic adhesive is used to adjoin the primary base to a vulcanized thermoplastic elastomer backing which has been deposited continuously across the adhesive backed fabric. The thickness of the vulcanized thermoplastic elastomer layer is between about 20 mils and about 40 mils and preferably in the range of about 30 mils. In the preferred practice of the present invention, a stabilizing layer of woven or nonwoven thermoplastic scrim or film will be deposited on the underside of the thermoplastic elastomer backing and a second layer of vulcanized thermoplastic elastomer will be deposited across the scrim in a sealing manner. The thickness of this second layer of vulcanized thermoplastic elastomer will be in the range of about 20 and 40 mils and preferably about 30 mils.

BRIEF DESCRIPTION OF THE DRAWINGS

FIG. 1 is a schematic representation of a mat forming process according to the present invention.

FIG. 2 is a cross-section of the potentially preferred mat of the present invention as formed by the process illustrated in FIG. 1.

While the invention has been illustrated and will be described in connection with certain preferred embodiments and practices, it is to be understood that it is not intended to in any way limit the invention to such embodiments and practices. On the contrary, it is intended to cover all alternatives, modifications and equivalents as may be included within the spirit and scope of the invention as limited and defined by the appended claims.

DETAILED DESCRIPTION

Turning now to the drawings, in FIG. 1 there is shown a process line for the production of a mat according to the present invention. As shown, a primary fabric 10 is withdrawn from a supply roll 12 for application of various substrate layers. The primary fabric 10 preferably includes a plurality of pile yarns 14 of cotton, nylon, polyester or other suitable material tufted through a woven or nonwoven carrier layer 16. In the preferred embodiment, the carrier layer 16 is a nonwoven layer of polypropylene.

In practice, the primary fabric 10 is transferred from the supply roll 12 to a first heating unit 20 for application of preheat so as to raise the temperature of the primary fabric to a level of between about 220° F. to about 260° F. A first extruder 22 is thereafter used to deposit a layer of adhesive 24 across the surface of the carrier layer 16 from which the tufts of yarn do not extend. In the preferred practice, the first extruder will be situated to deposit the adhesive 24 on a first nip roll 26 for passage between the first nip roll and a first casting roll 28. The first nip roll 26 will preferably include means to pull a vacuum at a level of between about 10 and 20 inches of mercury at the face of the primary fabric as the adhesive 24 is being deposited so as to improve the adherence of the adhesive 24 to the back of the carrier layer 16. Since the adhesive 24 is applied at a temperature of between about 320° F. and 560° F., it has been found that heating the first casting roll 28 at a level of up to about 200° F. or more further facilitates the adhesive application process.

In the preferred practice of the present invention, the adhesive 24 is applied at a thickness of between about 4 mils and about 12 mils. The adhesive is preferably an olefin based adhesive so as to improve adhesion to the vulcanized thermoplastic elastomer backing applied in later steps. Specifically, one potentially preferred adhesive is a thermoplastic adhesive resin based on polyethylene which is believed to be available from Exxon Corporation under the trade designation ATX-310. By way of illustration only, other suitable adhesives may include thermoplastic adhesive resins based on polypropylene. One such polypropylene based adhesive is believed to be available from Uniroyal Chemical Company, Inc. under the trade designation Polybond® 2006. Yet another potential adhesive is a modified ethylene-vinyl acetate co-polymer resin believed to be available from Quantum Chemical Company in Cincinnati, Ohio under the trade designation Plexar® PX5298.

It has been found that the air space between the first extruder 22 and the point of application on the primary fabric 10 is extremely important. Specifically, it has been found that this air space should be no grater than about 4 inches and is preferably in the range of about 1 inch or less.

Following application of the layer of adhesive 24 at the first extruder 22, the primary fabric 10 with applied adhesive is thereafter conveyed to a second heating unit 30 for heating to a level of between about 220° F. and 260° F. The heated composite structure is thereafter conveyed to a second extruder 32 for application of a first layer of vulcanized thermoplastic elastomer 36 (FIG. 2).

In the preferred practice, a layer of polyolefin based reinforcing scrim 40 which may be either woven or nonwoven material is conveyed to the nip between a second nip roll 42 and second casting roll 44 to thereby form a layered structure wherein the vulcanized thermoplastic elastomer is disposed across the previously deposited layer of adhesive 24 and the scrim is deposited on the backing of the thermoplastic elastomer. It is, of course, to be understood that the reinforcing scrim 40 could be eliminated if desired.

As will be appreciated, the joining of material layers at the nip between the second nip roll 42 and the second casting roll 44 provides for the application of significant pressure on the composite materials. It has been found that the edges of the mat material which have no tufts extending therefrom may tend to be damaged as the composite materials are squeezed through the nip. To alleviate this problem the second nip roll 42 is preferably formed of a relatively soft rubber having a Shore A hardness of between about 40 and about 80 and preferably about 50 so as to permit the nip roll 42 to deform around the higher profile tufted areas of the mat material thereby tending to equalize the pressure distribution as the composite is passed through the nip between the rolls. The nip roll 42 could also be provided with belt structures (not shown) at either end of the nip roll to help equalize stresses applied across the composite materials. The width of these belt structures is substantially equivalent to the width of the nontufted boundary edge of the mat material. It has been found that by the placement of these belt structures at the edges of the nip roll that stresses are more uniformly distributed across the composite fabric structure, thereby substantially reducing any potential for damage to the nontufted edges.

The layer of vulcanized thermoplastic elastomer (vulcanized TPE) 36 is preferably applied from the second extruder at elevated temperatures of at least about 450° F. and more preferably 500° F. or more. The vulcanized thermoplastic elastomer which is utilized is preferably an EPDM based olefinic thermoplastic vulcanized elastomer such as is disclosed and described in U.S. Pat. No. 4,130,535 to Coran, U.S. Pat. No. 4,311,628 to Abdou-Sabet et al. and U.S. Pat. No. 4,594,390 to Abdou-Sabet et al. (all incorporated by reference).

The preferred vulcanized TPE's include cross-linked rubber particles dispersed through a continuous matrix of thermoplastic material (i.e. a rubber phase and a plastic phase). An average rubber particle size of one micron or less is favorable in the elastomer for use in the present invention. The rubber phase of the vulcanized TPE is preferably EPDM but may also be formed from nitrile, butyl, natural or styrene butadiene rubber polymers. Such vulcanized TPE's are believed to be available from Advanced Elastomer Systems L.P. in Akron, Ohio under the trade designation Santoprene®.

As will be appreciated, the use of such vulcanized TPE's permits the controlled application of specific thicknesses of the polymer. Specifically, the thickness of the layer of vulcanized thermoplastic elastomer 36 applied by the second extruder is preferably greater than 20 mils, and more preferably in the range of between about 20 mils and about 40 mils and most preferably about 30 mils.

While the production of the mat may be concluded after the disposit of the first layer of vulcanized TPE from the second extruder 32, in the preferred practice, the composite which is formed at the nip between the second nip roll and casting roll 42, 44 is thereafter conveyed to a third heating unit 50. The third heating unit 50 preferably heats the composite formed at the second extruder to a level of between about 220° F. to about 260° F. The heated composite is thereafter preferably passed between a third nip roll 52 and a third casting roll 54. In the preferred practice, the third nip roll 52 is also either deformable or provided with belt structures as previously described so as to protect the nontufted edge material.

As the composite material including the layer of vulcanized thermoplastic elastomer 36 and reinforcing scrim 40 is passed between the third nip roll 52 and casting roll 54, a second layer of vulcanized TPE 60 is preferably deposited by a third extruder 62. In the preferred practice, the composition and disposition of the second layer of vulcanized TPE will be substantially similar to that of the first layer. That is, the temperature of the vulcanized TPE will preferably be at least about 450° F. and most preferably about 500° F. or more and the thickness of the resultant layer will be between about 20 mils and about 40 mils. The resultant final mat structure 70 may thereafter be transferred to a take-up roll 72 and then cut into sections of appropriate length for us as mats.

Accordingly, it can be seen that the present invention provides a continuous process for the production of mat structures which gives rise to a highly useful and easily manufactured product. While specific embodiments and practices have been illustrated and described in accordance with the present invention, it is to be understood that the invention is not limited thereto, since modifications may be made in other embodiments of the principals will occur to those skilled in the art to which this invention pertains. Therefore, it is intended to cover any such modifications and alternatives as incorporate the features of the present invention within the true spirit and scope of the following claims and its equivalent.

What is claimed is:

1. A launderable floor covering mat, comprising:

a plurality of tufts disposed in a carrier layer;

a layer of thermoplastic adhesive disposed on the side of the carrier layer from which the tufts do not extend; and at least a first layer of vulcanized thermoplastic elastomer including cross-linked rubber particles dispersed in a matrix of thermoplastic disposed over the layer of thermoplastic adhesive, wherein the thickness of the first layer of vulcanized thermoplastic elastomer is greater than about 20 mils and wherein the floor covering mat possesses suitable flexibility to be laundered by an industrial washing machine; and further including a reinforcing layer of vulcanized thermoplastic elastomer disposed in sealing relation over the reinforcing layer of thermoplastic material wherein the second layer of vulcanized thermoplastic elastomer has a composition which is substantially the same as the first layer of vulcanized thermoplastic elastomer.

2. The floor covering mat of claim 1, wherein the thickness of the first layer of vulcanized thermoplastic elastomer is about 20 mils to about 40 mils.

3. The floor covering mat of claim 2, wherein the thickness of the second layer of vulcanized thermoplastic elastomer is about 20 mils to about 40 mils.

* * * * *